(12) United States Patent
Torjesen (10) Patent No.: US 11,492,998 B2
(45) Date of Patent: Nov. 8, 2022

(54) FLEXIBLE AFT COWLS FOR AIRCRAFT

(71) Applicant: The Boeing Company, Chicago, IL (US)

(72) Inventor: Luke D. Torjesen, Brier, WA (US)

(73) Assignee: THE BOEING COMPANY, Chicago, IL (US)

(*) Notice: Subject to any disclaimer, the term of this patent is extended or adjusted under 35 U.S.C. 154(b) by 264 days.

(21) Appl. No.: 16/721,157

(22) Filed: Dec. 19, 2019

(65) Prior Publication Data
US 2021/0190000 A1 Jun. 24, 2021

(51) Int. Cl.
| F02K 1/10 | (2006.01) |
| B64D 33/04 | (2006.01) |
| F02K 1/82 | (2006.01) |
| F01D 25/30 | (2006.01) |
| F02K 3/06 | (2006.01) |

(52) U.S. Cl.
CPC ............... *F02K 1/10* (2013.01); *B64D 33/04* (2013.01); *F01D 25/30* (2013.01); *F02K 1/82* (2013.01); *F02K 3/06* (2013.01); *F05D 2220/323* (2013.01); *F05D 2240/128* (2013.01)

(58) Field of Classification Search
CPC . F02K 1/10; F02K 1/12; F02K 1/1207; F02K 1/82; F02K 1/827; F02K 1/822; F02K 3/07; B64D 33/04; F01D 25/30; F01D 21/14; F02C 9/18
See application file for complete search history.

(56) References Cited

U.S. PATENT DOCUMENTS

| 2,693,078 | A | * | 11/1954 | Laugher | F02K 1/805 |
| | | | | | 239/265.39 |
| 3,454,227 | A | * | 7/1969 | Motycka | F02K 1/18 |
| | | | | | 239/265.39 |
| 4,544,098 | A | * | 10/1985 | Warburton | F02K 1/1223 |
| | | | | | 239/265.41 |
| 2007/0235080 | A1 | * | 10/2007 | Hocking | F02K 3/06 |
| | | | | | 137/85 |
| 2009/0067993 | A1 | * | 3/2009 | Roberge | F02C 7/047 |
| | | | | | 415/145 |
| 2016/0281639 | A1 | * | 9/2016 | Jackowski | F02K 1/12 |
| 2021/0095578 | A1 | * | 4/2021 | Sherman | F02K 1/822 |

* cited by examiner

*Primary Examiner* — Andrew H Nguyen
(74) *Attorney, Agent, or Firm* — Hanley, Flight & Zimmerman, LLC (57) ABSTRACT

Flexible aft cowls are disclosed. In some examples, an aircraft engine having a flexible aft cowl is disclosed. In some examples, the aircraft engine comprises an aft cowl having a flexible portion defining a throat area adjacent an engine core nozzle of the aircraft engine. In some examples, the flexible portion to move radially between a first radial position in response to pressure within a nacelle not exceeding a pressure threshold and a second radial position in response to pressure within the nacelle exceeding the pressure threshold. In some examples, the throat area defined by the flexible portion is greater when the flexible portion is in the second radial position than when the flexible portion is in the first radial position.

19 Claims, 9 Drawing Sheets

FLEXIBLE AFT COWLS FOR AIRCRAFT

FIELD OF THE DISCLOSURE

This disclosure relates generally to aircraft engine nacelles and, more specifically, to flexible aft cowls for aircraft.

BACKGROUND

Commercial aircraft utilize a propulsion system powered by a gas turbine engine (e.g., an engine core) to generate thrust. Additionally, commercial aircraft typically extract energy (e.g., high pressure bleed air) from an aircraft engine to power other aircraft systems. For example, energy is often extracted from an aircraft engine to power an environmental control system, which pressurizes a passenger cabin of the aircraft and/or thermal anti-icing systems to provide heated air for anti-icing applications.

SUMMARY

In some examples, an aircraft engine having a flexible aft cowl is disclosed. In some examples, the aircraft engine comprises an aft cowl having a flexible portion defining a throat area adjacent an engine core nozzle of the aircraft engine. In some examples, the flexible portion to move radially between a first radial position in response to pressure within a nacelle not exceeding a pressure threshold and a second radial position in response to pressure within the nacelle exceeding the pressure threshold. In some examples, the throat area defined by the flexible portion is greater when the flexible portion is in the second radial position than when the flexible portion is in the first radial position.

In some examples, an aft cowl of a thrust reverser for an aircraft engine is disclosed. In some examples, the aft cowl comprises a skin including a first skin segment and a second skin segment radially spaced from the first skin segment to form a gap therebetween. In some examples, the aft cowl comprises a biasing element to couple the first skin segment and the second skin segment.

In some examples, an aft cowl includes means for defining an engine compartment adjacent an engine core of an aircraft engine, where at least a portion of the means for defining the engine compartment defining a throat area adjacent an engine core nozzle of the aircraft engine. The aft cowl includes means for radially moving the means for defining the engine compartment between a first radial position in response to pressure within the means for engine compartment not exceeding a pressure threshold and a second radial position in response to pressure within the means for defining the engine compartment exceeding the pressure threshold, where the means for radially moving to vary the throat area when the means for defining the engine compartment moves between the first position and the second position.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft propulsion systems employ a mixture of exhaust from a gas turbine engine (e.g., an engine core) and airflow from a fan bypass to generate thrust. The propulsion system includes a nacelle that houses the engine core and defines the fan bypass to allow airflow to bypass the engine core and mix with the exhaust exiting the core nozzle. The nacelle includes an aft cowl (e.g., a thrust reverser aft cowl) that has an aft end surrounding the core engine such that an inner wall that defines a core compartment between an outer surface of the engine core and the inner wall (e.g., that surrounds the engine). In some examples, the inner wall is defined by a thrust reverser aft cowl.

During operation, aircraft often extract energy from the engine core (e.g., a high pressure compressor) to power various aircraft systems (e.g., environmental control systems, anti-icing systems, etc.). The bleed air is often extracted from a compressor of the engine core via fluid devices (e.g., valves) and routed to the various systems via ducts, hoses and/or other passageways that pass through the core compartment between an inner fixed wall of the aft cowl and an external surface of the engine core. However, if the fluid device or duct burst (e.g., a burst duct event), pressure within the core compartment may exceed a pressure threshold that exerts a radially outward net positive pressure on the inner fixed wall can lead to large, unacceptable deflections or damage to the system.

To alleviate or release this high pressure air from the engine compartment, conventional methods and apparatus utilize pressure relief doors that are located or implemented with the aft cowl, lower latch beam, or elsewhere on the core compartment. These pressure relief doors include latch systems that are configured to release and/or open the pressure relief doors when pressure within the core compartment exceeds a pressure threshold. However, such known pressure relief doors are complex, heavy, and expensive. For example, the pressure relief doors require hinges having latches and/or springs to activate at a specific pressure that increase complexity of installation and operation. Additionally, these pressure relief doors are typically made of a high grade metal (e.g., such as titanium) that can withstand the thermal environment (e.g., high temperature air (e.g., between approximately than 150 Fahrenheit (° F.) and 1000 Fahrenheit (° F.)), making the pressure relief doors heavy and expensive. As such, these pressure relief doors decrease engine performance or efficiency and increase manufacturing costs.

Example aft cowls disclosed herein include pressure relief apparatus to relieve high levels of pressure in an engine compartment resulting from a build-up, or a sudden spike, in engine bleed air pressure that exceeds a predetermined threshold amount, without adding significant weight to the vehicle. For example, the methods and apparatus disclosed herein advantageously increase engine performance or efficiency by reducing the weight and reducing manufacturing costs and complexity typically associated with conventional pressure relief door systems. In some examples, the disclosed pressure relief apparatus includes an aft cowl having a flexible portion defining a throat area adjacent an engine core discharge nozzle of the aircraft engine. In some examples disclosed herein, the flexible portion flexes or moves radially between a first radial position in response to pressure within a nacelle not exceeding a pressure threshold and a second radial position different than the first radial position in response to pressure within the nacelle exceeding the pressure threshold. In some examples, the pressure threshold is based on a burst duct pressure threshold of the nacelle. As such, a throat area defined by the flexible portion is greater when the flexible portion is in the second radial position than when the flexible portion is in the first radial position. The increase in the throat area is due high pressure bleed air from a bleed air system causing the flexible portion to flex to the second radial position and exiting an outlet of the throat area, for example. For example, the increase in throat area provided when the flexible portion is in the second position enables burst pressure reduction. Thus, expansion of the flexible portion reduces burst pressure within the core compartment.

In some examples, the flexible portion moves in a radial direction away from an engine core of the aircraft engine when the flexible portion is in the second radial position, and moves in a radial direction towards (e.g., standoffs) an engine core of the aircraft engine when the flexible portion is in the first radial position. That is, a dimension (e.g., diameter, a cross-sectional area, etc.)) of the flexible portion varies (e.g., increases and decreases) based on a pressure (e.g., a pressure threshold) within a core compartment of an aircraft engine, for example. In other words, a throat area of a flexible portion of an aft cowl disclosed herein is responsive to pressure within an engine core compartment of an aircraft engine. Additionally, standoffs supported by the engine core engage the flexible portion to limit (e.g., stop) further radially inward movement of the flexible portion (e.g., beyond the first radial position). Thus, the standoffs provide a stable throat area during normal operating conditions (e.g., burst pressure in a core compartment does not exceed a burst pressure threshold) as the standoffs prevent or restrict the aft cowl from moving radially inward when the aft cowl engages the standoffs.

To vary a throat area of an example aft cowl disclosed herein, a flexible portion disclosed herein includes a plurality of skin segments that can move (e.g., expand or contract) relative to a longitudinal axis of the aft cowl. In some examples, the skin segments can be formed or separated by a plurality of slots. The example slots extend in an aft-fore direction a first distance from an outer edge of the aft cowl. In some examples, the skin segments are coupled via a biasing element. As used herein, a biasing element includes, but not limited to, a spring, a compliant splice, a compliant coupling, a tangentially flexible element, a tangentially compliant stiffener, a hat stiffener, a tangential spring, a bellows, etc.

Figure 1:
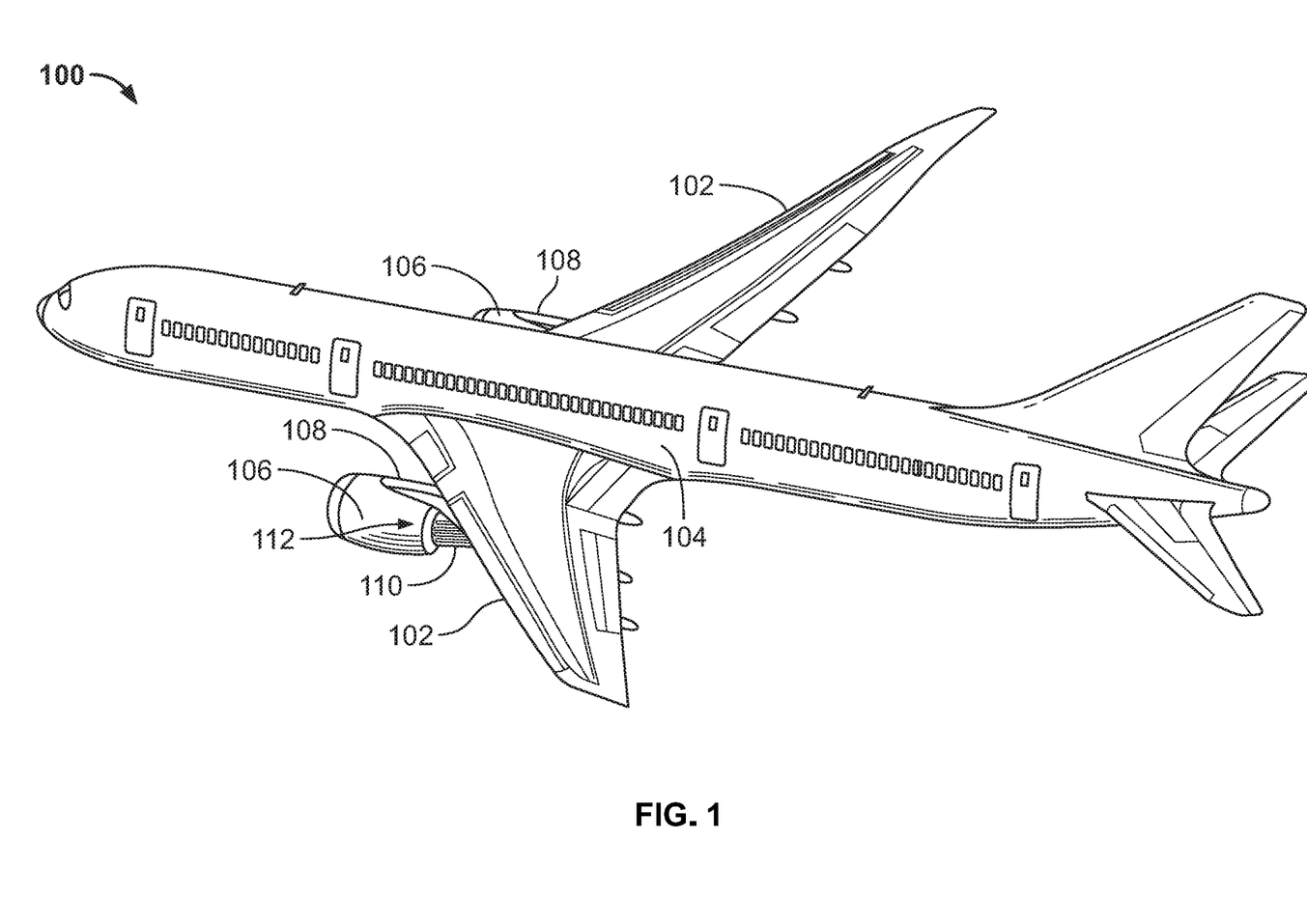
FIG. 1 depicts an example aircraft having an example aircraft engine constructed in accordance with the teachings disclosed herein.
Figure 2:
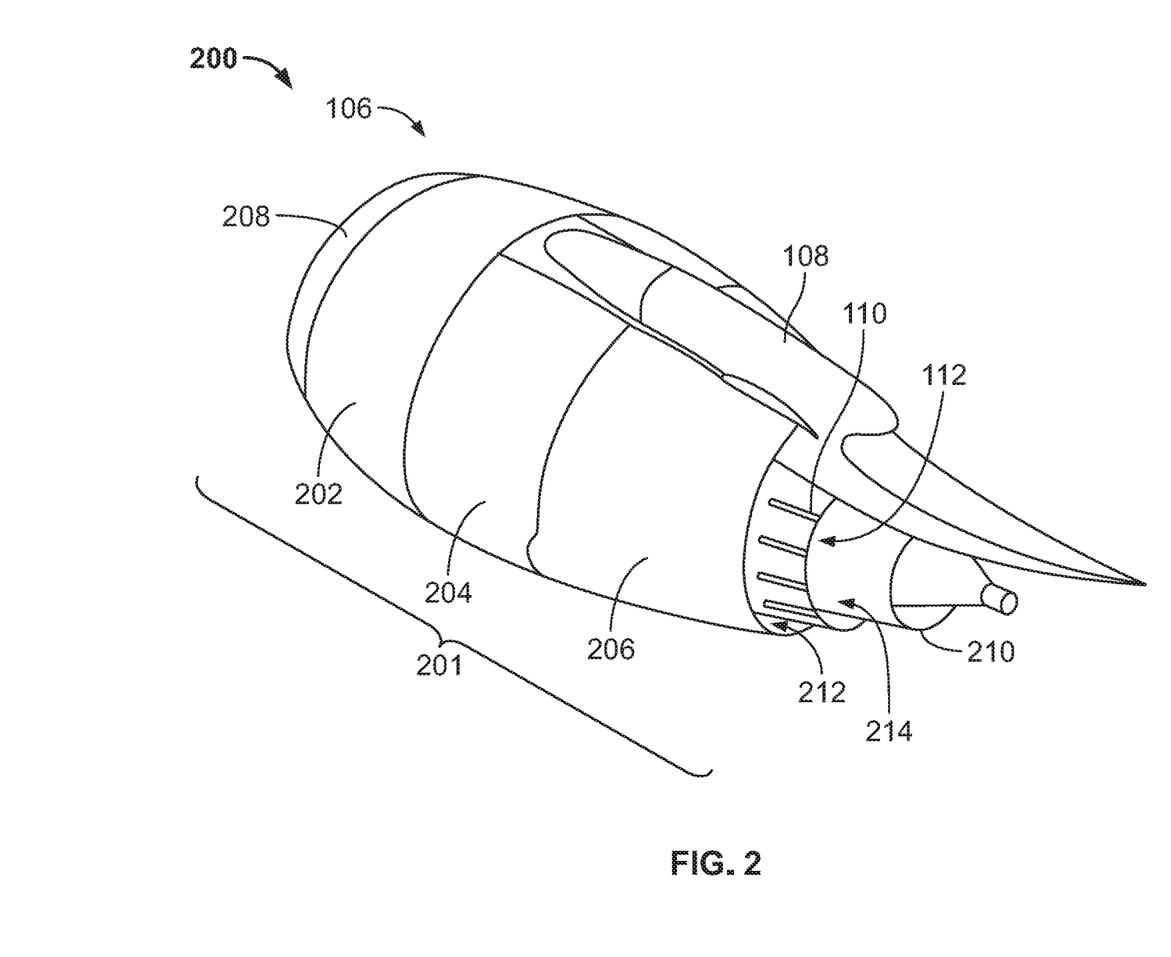
FIG. 2 is a perspective view of the example aircraft engine of FIG. 1.

FIG. 1 illustrates an example aircraft 100 having an example aircraft engine 106 constructed in accordance with the teachings disclosed herein. The aircraft 100 includes wings 102 (e.g., a right wing and a left wing) extending outward from a fuselage 104. Each of the wings 102 of the illustrated example supports the aircraft engine 106 via a pylon 108. Each aircraft engine 106 is a turbofan engine that includes an aft cowl 110 (e.g., a flexible aft cowl) constructed in accordance with the teachings of this disclosure. As described in greater detail below, the aft cowl 110 includes a pressure relief system 112 that flexes (e.g., radially flexes) to mitigate excessive pressurization within the aircraft engine 106. Unlike conventional aft cowls, the aft cowl 110 does not employ pressure relief doors to alleviate pressure within the aircraft engine 106. To the contrary, the aft cowl 110 flexes (e.g., radially flexes) relative to a discharge nozzle 210 (FIG. 2). Although the aircraft 100 of FIG. 1 is a commercial aircraft, the aft cowl 110 disclosed herein can be implemented with other types of aircraft (e.g., military aircraft, etc.). Although the aircraft engine 106 of FIG. 1 is a turbofan engine, the aft cowl 110 disclosed herein can be implemented with other types of aircraft engine(s).

FIG. 2 is a perspective view of the aircraft engine 106 of FIG. 1. The aircraft engine 106 includes a nacelle 200. The nacelle 200 houses an engine core (e.g., an engine core 302 of FIG. 3) and provides an aerodynamic exterior surface 201 of the aircraft engine 106 to reduce drag. The nacelle 200 includes a forward section or inlet cowl 202 (e.g., an outer panel), an intermediate section or fan cowl 204, and a thrust reverser cowl 206 that form or define the aerodynamic exterior surface 201 of the nacelle 200. A leading edge 208 (e.g., an inlet ring) of the nacelle 200 is coupled or mounted to the inlet cowl 202 to provide an inlet. The aft cowl 110 surrounds the discharge nozzle 210. For example, the aft cowl 110 is positioned between the thrust reverser cowl 206 and the discharge nozzle 210 of the aircraft engine 106.

The fan cowl 204 and/or the thrust reverser cowl 206 move relative to the pylon 108. For example, the fan cowl 204 (e.g., a clam-shell cowl) moves (e.g., pivots) relative to the pylon 108 to allow access to a fan or other engine components within the nacelle 200 during maintenance. To activate the thrust reverser cowl 206 to help slow down the aircraft 100 during landing, the thrust reverser cowl 206 moves (e.g., translates in the aft-fore direction, pivots relative to the pylon 108, etc.) relative to the fan cowl 204 and/or the aft cowl 110 to divert thrust to act against a forward travel of the aircraft and decelerate the aircraft 100. The thrust reverser cowl 206 is radially spaced from the aft cowl 110 to allow the thrust reverser cowl 206 to move relative to the aft cowl 110. Additionally, the thrust reverser cowl 206 is radially spaced away from the aft cowl 110 such that the thrust reverser cowl 206 and the aft cowl 110 define a fan bypass 212 of the aircraft engine 106. The fan bypass 212 exhausts air adjacent an outlet 214 defined by the aft cowl 110.

Figure 3A:
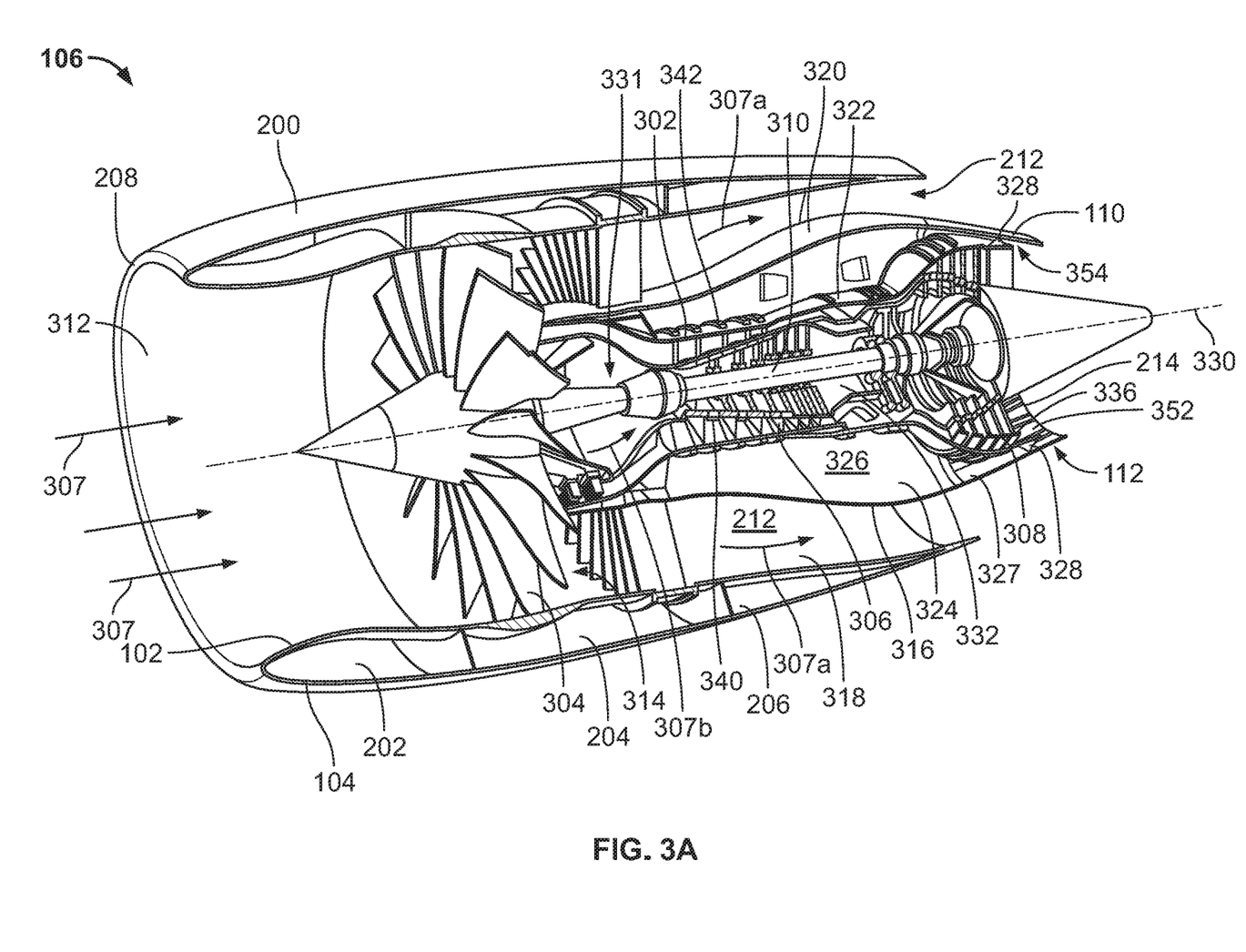
FIG. 3A is a partial, cutaway perspective view of the example aircraft engine of FIGS. 1 and 2.
Figure 3B:
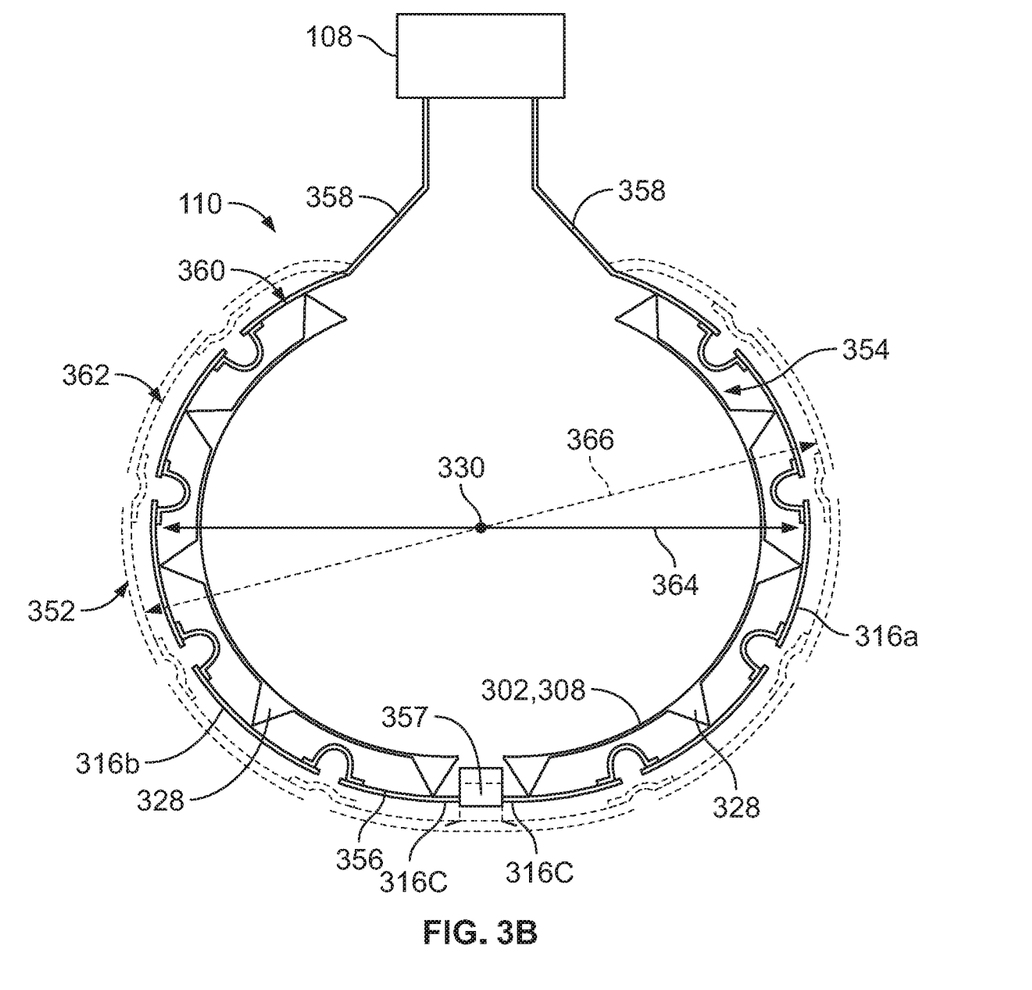
FIG. 3B is an end view of an example aft cowl outlet of the example aircraft engine of FIGS. 1, 2 and 3A.

FIG. 3A is a partial cutaway, perspective view of the aircraft engine 106 of FIGS. 1 and 2. FIG. 3B is a schematic end view of the outlet 214 of the aft cowl 110. Some of the components of the aircraft engine 106 for mounting to the pylon 108 (FIG. 1) and a thrust reverser system are omitted from FIGS. 3A and 3B for clarity. The aircraft engine 106 of FIG. 3 includes the engine core 302 (e.g., a gas turbine engine) having a fan 304, an engine compressor 306, an engine turbine 308 and an engine shaft 310 that operatively couples the fan 304, the engine compressor 306 and the engine turbine 308. The engine core 302 is enclosed by the nacelle 200. For example, the inlet cowl 202 defines an inlet 312 of the aircraft engine 106, the fan cowl 204 surrounds the fan 304 to define an air intake 314, and the thrust reverser cowl 206 surrounds an inner wall 316, and the inner wall 316 surrounds the engine core 302. An inner surface 318 of the thrust reverser cowl 206 and an outer surface 320 of the inner wall 316 define the fan bypass 212. The aft cowl 110 is adjacent the inner wall 316 and surrounds a portion of the engine turbine 308 and the discharge nozzle 210 (FIG. 1). The discharge nozzle 210 is not shown in FIGS. 3A and 3B. An outer surface 322 of the engine core 302 and inner surfaces 324, 327 of the inner wall 316 and the aft cowl 110, respectively, define a core compartment 326. The engine core 302 includes standoffs 328 (e.g., engine radial standoffs, aft cowl standoffs) that provide separation between the aft cowl 110 and the engine core 302. The standoffs 328 are radially spaced relative to a longitudinal axis 330 of the aircraft engine 106 (e.g., about a circumference of the engine turbine 308).

In operation, the engine core 302 drives the fan 304 to produce thrust. The fan 304 rotates within the nacelle 200 of the aircraft engine 106 to produce airflow 307. A first portion 307a of the airflow 307 flows through the fan bypass 212 (e.g., a duct, a passageway, a channel, a nozzle duct, etc.) that bypasses the engine core 302 and a second portion 307b of the airflow 307 is provided to the engine core 302 for combustion. The engine core 302 operates by drawing air, via the fan 304, through a compressor intake section 331 of the engine compressor 306 in the engine core 302. After exiting the engine compressor 306, the highly pressurized air is provided to a combustion chamber 332, where fuel is injected and mixed with the high pressure air and ignited. The high energy airflow exiting the combustion chamber 332 turns (e.g., blades of) the engine turbine 308, which is coupled to the engine shaft 310. Rotation of the engine shaft 310 turns (e.g., blades of) the engine compressor 306 and the fan 304. The heated air is exhausted via an outlet 336 (e.g., the discharge nozzle 210 of FIG. 1) where it mixes with cooler air, provided by the fan 304, that bypasses the engine core 302 via the fan bypass 212 to produce forward thrust that propels the aircraft 100 (FIG. 1) in a forward direction.

During operation, the aircraft 100 extracts energy from the aircraft engine 106 to power other systems of the aircraft 100. For example, the aircraft 100 extracts energy from the aircraft engine 106 to power an environmental control system that pressurizes a passenger cabin of the aircraft and/or a thermal anti-icing system that provides heated air for anti-icing applications. Energy to these systems is typically provided by bleed air extracted from the engine compressor 306. To meet pressure and/or temperature demands of the various aircraft systems, bleed air is often extracted from (e.g., a high stage of) the engine compressor 306 that provides bleed air having a pressure and/or temperature above that demanded by the various systems. The bleed air is extracted from the engine compressor 306 via a fluid device 340 (e.g., a shut-off valve, a fluid valve, etc.) and is routed via a conduit 342 (e.g., pipes, ducts, etc.) to the other systems of the aircraft 100. Specifically, the fluid device 340 and the conduit 342 adjacent the engine compressor 306 are in fluid communication with (e.g., are located within) the core compartment 326 between the engine core 302 and the inner wall 316.

In some instances, the fluid device 340 and/or the conduit 342 transporting the extracted bleed air are in fluid communication with the core compartment 326 can fail, causing high pressurized bleed air from the engine compressor 306 to flow into the core compartment 326 (e.g., a bust duct pressure event). In some examples, bleed air from the engine compressor 306 that flows into the core compartment 326 exerts significant amount of pressure (e.g., a burst duct pressure) and high temperature against the inner wall 316 of the aircraft engine 106. In some instances, pressure within the core compartment 326 can exceed pressure within the fan bypass 212. In these conditions, the radially outward net positive pressure exerted on the inner wall 316 (e.g., if implemented without the inner wall 316 without pressure relief system 112), can lead to large, unacceptable deflections that can require subsequent maintenance (e.g., increasing costs) and/or inspections.

To ventilate or release the high pressure bleed air from the core compartment 326, the aft cowl 110 includes the pressure relief system 112 (e.g., a ventilation system). Specifically, to ventilate the core compartment 326, the pressure relief system 112 includes a flexible portion 352 that is responsive to pressure fluctuations in the core compartment 326. For example, the flexible portion 352 enables the aft cowl 110 to move radially relative to the longitudinal axis 330 to vary (e.g., increase or decrease) a throat area 354 and/or the outlet 214 of the aft cowl 110. For example, the throat area 354 is defined between the outer surface 322 of the engine core 302 (e.g., the engine turbine 308) and the inner surface 327 of the aft cowl 110.

Referring to FIG. 3B, the aft cowl 110 includes a first inner wall portion 316a (e.g., a right side wall) and a second inner wall portion 316b (e.g., a left side wall) that couple together to form the inner wall 316 (e.g., the aft cowl 110). Each of the first inner wall portion 316a and the second inner wall portion 316b includes non-flexible portions 358 that attach (e.g., are fixed to) to the pylon 108. The non-flexible portions 358 are skin panels that are rigid and do not flex or expand relative to the pylon 108. The first inner wall portion 316a and the second inner wall portion 316b are attached at respective terminating ends 316c via a connector 357 (e.g., a radial bracket, a latch, a side-to-side latch system, etc.). Although the aft cowl 110 flexes (e.g. radially flexes), the aft cowl 110 is laterally fixed relative to the pylon 108. For example, the aft cowl 110 does not translate in an aft-fore direction relative to the pylon 108 and/or the thrust reverser cowl 206.

FIG. 3B illustrates the aft cowl 110 in a first radial position 360 shown in solid line and a second radial position 362 shown in dashed line. For example, the aft cowl 110 flexes (e.g., radially contracts and expands) between the first radial position 360 and the second radial position 362. In the first radial position 360, the aft cowl 110 provides a first outlet area between the aft cowl 110 and the discharge nozzle 210 (FIG. 2). In the second radial position 362, the aft cowl 110 provides a second outlet area between the aft cowl 110 and the discharge nozzle 210 that is greater than first outlet area. For example, the flexible portion 352 of the aft cowl 110 defines a first dimension 364 (e.g., a first diameter) when the aft cowl 110 is in the first radial position 360 and a second dimension 366 (e.g., a second diameter) different than the first dimension 364 when the aft cowl 110 is in the second radial position 362. Specifically, the flexible portion 352 moves (e.g. radially) relative to the longitudinal axis 330 such that the flexible portion 352 moves in a direction (e.g., a radial direction) away from the engine core 302 when the flexible portion 352 moves to the second radial position 362 and the flexible portion 352 moves in a direction (e.g., a radial direction) toward the engine core 302 (e.g., the standoffs 328) when the flexible portion 352 moves to the first radial position 360. Thus, the flexible portion 352 can flex (e.g., stretch) such that the second dimension 366 is greater than the first dimension 364 to increase mass flow rate/volume. For example, the first dimension 364 is smaller than the second dimension 366 by between approximately one-quarter (¼) inch to two (2) inches. However, the throat area 354, the first dimension 364 and/or the second dimension 366 can be designed to expand to any desired area based on the specifications of the aircraft 100.

In the example of FIG. 3B, the throat area 354 and/or the outlet 114 generally have circular cross-sectional shapes when the aft cowl 110 is in the first radial position 360 and an oblong cross-sectional shape (e.g., elliptical shape) when the aft cowl 110 is in the second radial position 362. In some examples, the throat area 354 and/or the outlet 356 of the aft cowl 110 can have any other suitable cross-sectional shape (e.g., square, rectangular) when the aft cowl 110 is in the first radial position 360 and the second radial position 362.

Specifically, the aft cowl 110 flexes to vary (e.g., increase) the first dimension 364 of the throat area 354 and/or the outlet 214 of the aft cowl 110 when the aft cowl 110 moves from the first radial position 360 to the second radial position 362. Increasing the throat area 354 of the aft cowl 110 enables high pressure bleed air to exit from the core compartment 326 via the outlet 356. Thus, the aft cowl 110 does not employ pressure relief doors that are typically used to manage and/or ventilate airflow and/or pressure of the core compartment 326. In contrast, the aft cowl 110 enables radial expansion of the throat area 354 or the outlet 356 to increase fluid flow volume or area between the engine core 302 and the aft cowl 110.

Additionally, the aft cowl 110 flexes to vary (e.g., decrease) the throat area 354 and/or the outlet 214 of the aft cowl 110 when the ventilation system 350 moves from the second radial position 362 to the first radial position 360. To manage the first portion 307a of airflow 307 through the fan bypass 212, the aft cowl 110 enables relief of the first portion 307a of the airflow 307 in the fan bypass 212 by imparting a force to cause the flexible portion 352 of the aft cowl 110 to move to the first radial position 360 to create an expanded area of the fan bypass 212. The standoffs 328 control or limit movement of the aft cowl 110 to the first radial position 360. For example, the standoffs 328 engage (e.g., directly engage the inner surface 327 of) the aft cowl 110 to prevent radial movement toward the engine core 302 beyond (e.g., smaller than) the first radial position 360.

Figure 4A:
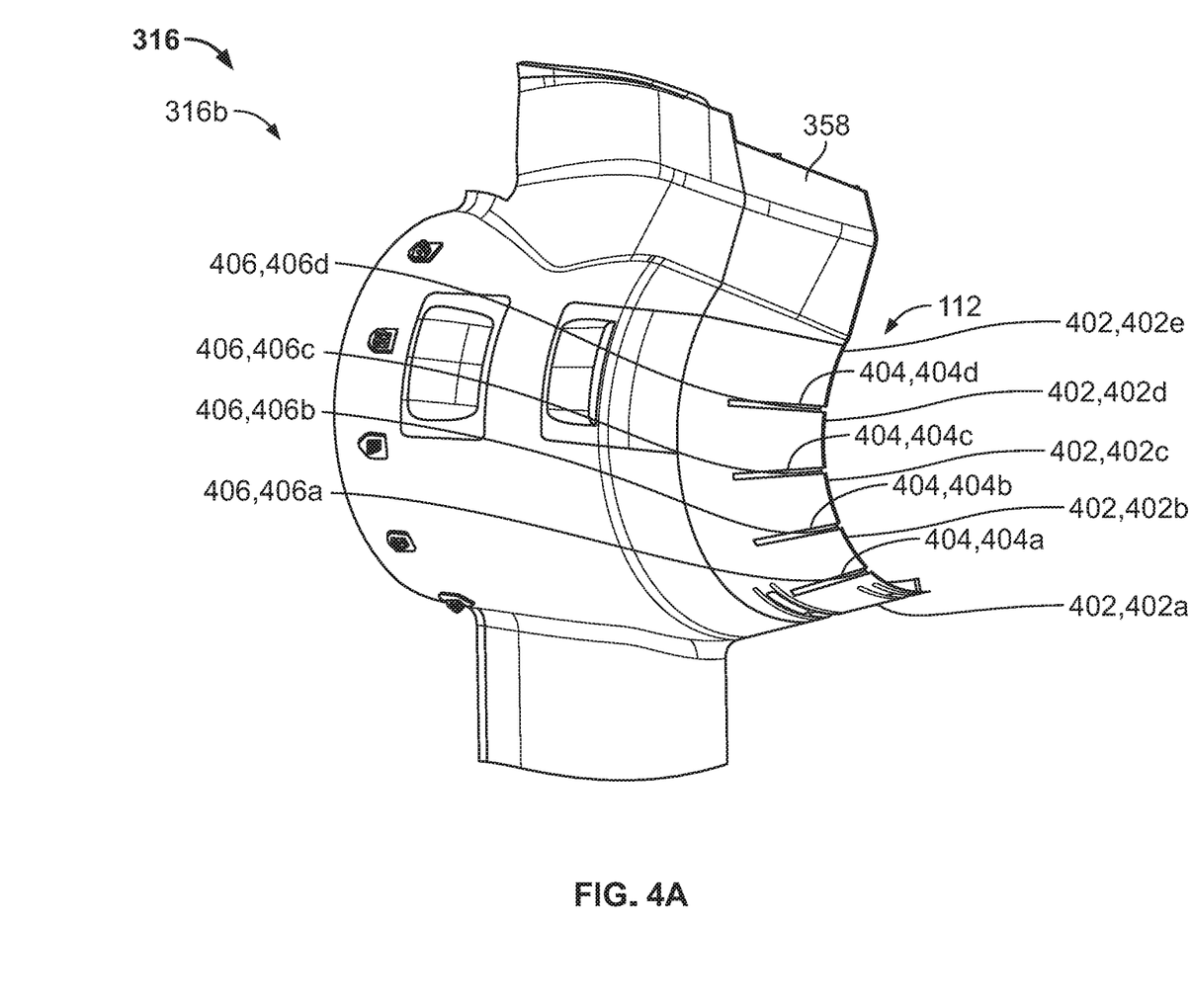
FIG. 4A is a perspective view of an example first inner wall of the example aircraft engine of FIGS. 1, 2, 3A and 3B.
Figure 4B:
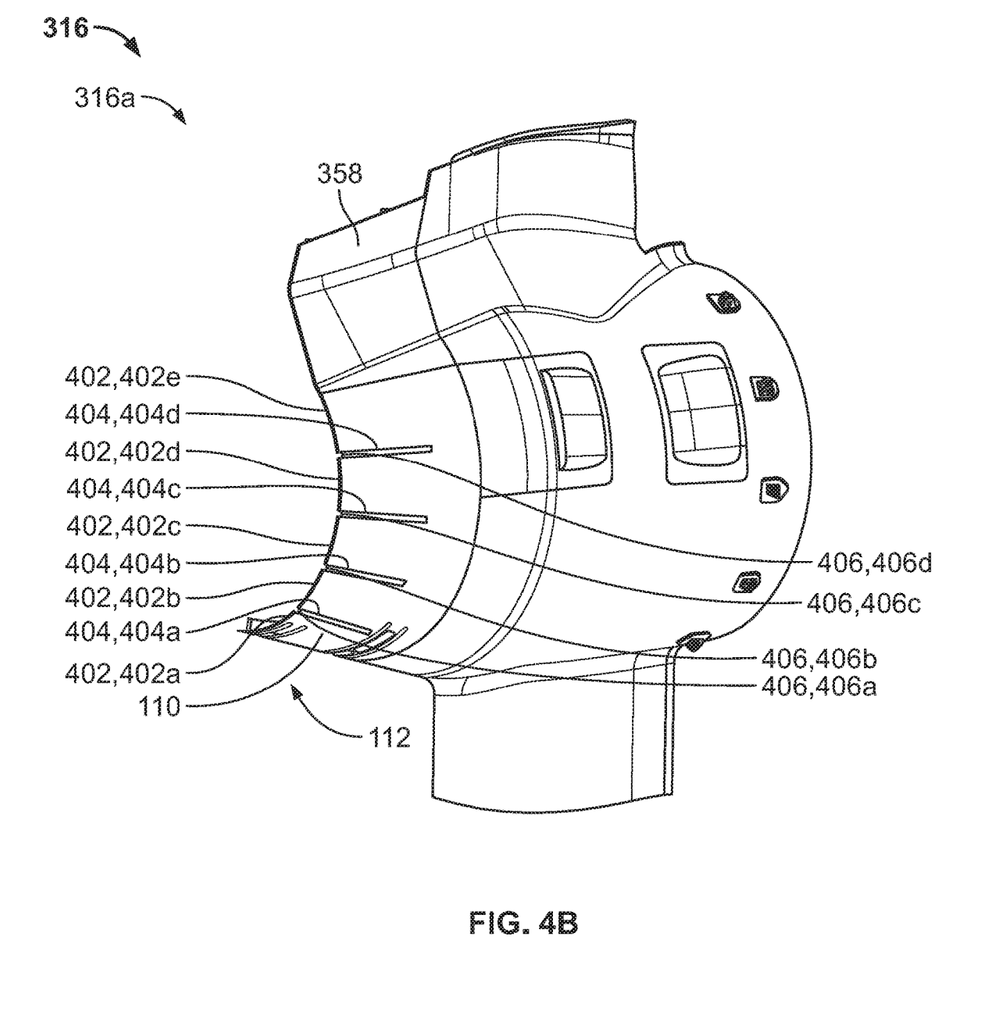
FIG. 4B is a perspective view of an example second inner wall of the example aircraft engine of FIGS. 1, 2, 3A and 3B.

FIG. 4A is a perspective view of the first inner wall portion 316a of FIG. 3B. FIG. 4B is a perspective view of the second inner wall portion 316b of FIG. 3B. FIG. 4B is a mirror image of FIG. 4A. The aft cowl 110 of FIGS. 4A and 4B is coupled to (e.g., formed with) the inner wall 316 of FIG. 3. In some examples, the inner wall 316 and the aft cowl 110 form a unitary structure. To enable the flexible portion 352, the aft cowl 110 includes a plurality of skin segments 402. The skin segments 402 are radially spaced around a portion (e.g., a circumference) of the aft cowl 110. For example, the first inner wall portion 316a and the second inner wall portion 316b of FIGS. 4A and 4B each include a first skin segment 402a, a second skin segment 402b, a third skin segment 402c, a fourth skin segment 402d and a fifth skin segment 402e (e.g., the aft cowl 110 includes ten skin segments 402, collectively). However, in some examples, the aft cowl 110 includes more than ten skin segments (e.g., 12, 15, 20, etc.) or less than ten skin segments (e.g., 2, 5, 7). In some examples, the aft cowl 110 of the first inner wall portion 316a can have the same number of skin segments 402 as the second inner wall portion 316b or a different number of skin segments 402 as the second inner wall portion 316b. For example, the first inner wall portion 316a can have 4 skin segments and the second inner wall portion 316b can have 5 or 7 skin segments.

To form or define the skin segments 402 of FIG. 4A and 4B, the aft cowl 110 of the illustrated example includes a plurality of slots 404 (e.g., gaps). For example, the first inner wall portion 316a and the second inner wall portion 316b (e.g., the aft cowl 110) each include a first slot 404a (e.g., a first gap), a second slot 404b (e.g., a second gap), a third slot 404c (e.g., a third gap) and a fourth slot 404d (e.g., a fourth gap) to from the skin segments 402a-e (e.g., the aft cowl 110 includes eight slots 404, collectively). For example, respective ones of the slots 404a-d are formed between respective ones of the skin segments 402a-e.

To enable the aft cowl 110 to flex, the pressure relief system 112 includes a plurality of biasing elements 406 (e.g., tangentially compliant stiffeners). The biasing elements 406 are positioned adjacent the respective ones of the slots 404. For example, the first inner wall portion 316a and the second inner wall portion 316b (e.g., the aft cowl 110) each include a first biasing element 406a, a second biasing element 406b, a third biasing element 406c and a fourth biasing element 406d (e.g., the aft cowl 110 includes eight biasing elements 406, collectively). For example, the first biasing element 406a is associated with the first slot 404a, the second biasing element 406b is associated with the second slot 404b, the third biasing element 406c is associated with the third slot 404c, and the fourth biasing element 406d is associated with the fourth slot 404d. Specifically, the biasing elements 406 span across the slots 404. The biasing elements 406 enable radial movement of the skin segments 402 towards the first radial position 360 when a pressure within the nacelle 200 does not exceed a pressure threshold and enables radial movement of the skin segments 402 towards the second radial position (362) when the pressure within the nacelle 200 exceeds the pressure threshold. The biasing elements 406 are located on the inner surface 327 of the aft cowl 110 as shown in greater detail in FIG. 5. In the illustrated example, each of the biasing elements 406 is an axial hat stiffener. However, in other examples, the biasing elements 406 can be springs, tangential springs, compression springs, bellows, ribs, and/or any other biasing element that enables the skin segments 402 to radially flex relative to the engine core 302 (e.g., FIG. 3A).

Figure 5:
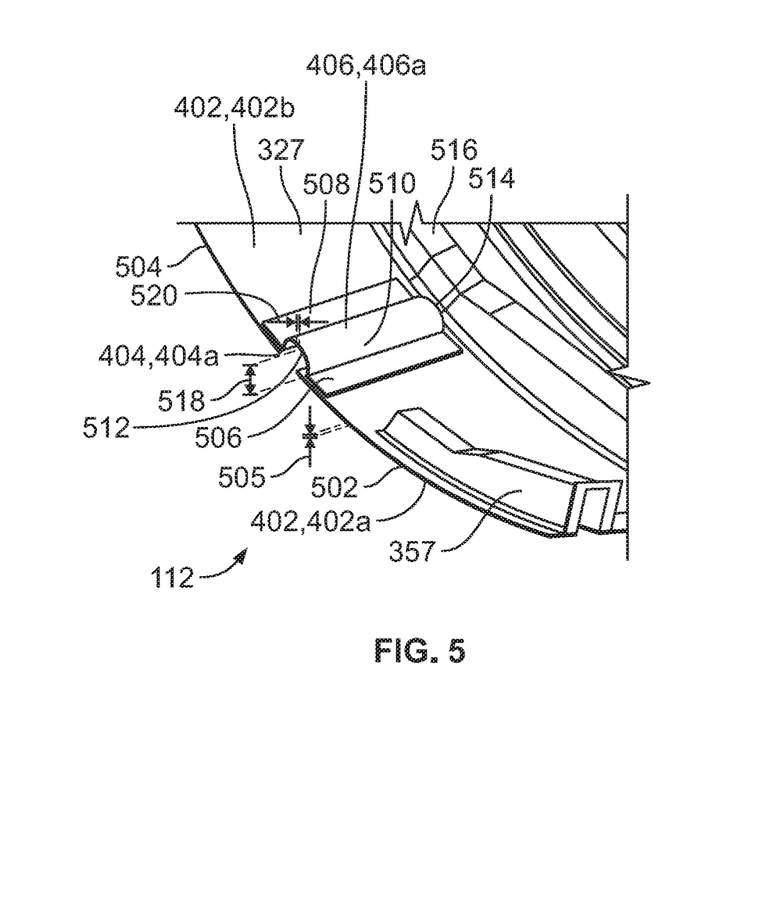
FIG. 5 is a partial, perspective view of the example second inner wall of FIG. 4A.

FIG. 5 is a partial, perspective view of the second inner wall portion 316b of FIG. 4A.

Specifically, FIG. 5 illustrates the inner surface 327 of the second inner wall portion 316b of FIG. 4A. FIG. 5 illustrates the first skin segment 402a, the second skin segment 402b, the first slot 404a and the first biasing element 406a. Although only the first biasing element 406a, the first skin segment 402a, the second skin segment 402b and the first slot 404a are shown, the biasing elements 406, the skin segments 402 and the slots 404 of FIGS. 4A and 4B are substantially similar (e.g., identical) to the first biasing element 406a, the first skin segment 402a, the second skin segment 402b and the first slot 404a shown in FIG. 5.

The first biasing element 406a couples the first skin segment 402a and the second skin segment 402b. The skin segments 402 are panels that are formed of a rigid or semi-rigid material(s). For example, the first skin segment 402a is a first panel 502 and the second skin segment 402b is a second panel 504. For example, the skin segments 402 have a thickness 505. In some examples, the thickness 505 can be approximately between 0.025 inches and 0.25 inches. To couple to the first skin segment 402a and the second skin segment 402b, the biasing element 406 includes a first flange 506 and a second flange 508. The first flange 506 couples to the first skin segment 402a (e.g., via fasteners, bolts, welds, etc.) and the second flange 508 couples to the second skin segment 402b (e.g., via fasteners, bolts, welds, etc.). The first biasing element 406a includes a body 510 formed between the first flange 506 and the second flange 508. In other words, the body 510 joins or couples the first flange 506 and the second flange 508. The body 510 of the first biasing element 406a spans across (e.g., extends across) or overlaps the first slot 404a (e.g., a first gap). The body 510 is a flexible body that can vary (e.g., increase or decrease) a radius of curvature to enable the first skin segment 402a to move away from or towards the second skin segment 402b when the aft cowl 110 flexes between the first radial position 360 and the second radial position 362. Specifically, the body 510 has a convex profile in the orientation or along the longitudinal axis 330 of the aircraft engine 106. Thus, the body 510 has a U-shaped profile that extends in a direction away from the first slot 404a (e.g., and toward the engine core 302). In some examples, a height 518 of the body 510 and/or thickness 520 of the body 510 defines a spring rate of the biasing element 406. In some examples, the body 510 can have a tapered shape to tune a stiffness characteristic of the biasing elements 406. In some examples, the spring rate can be adjusted based on a desired opening of the throat area 354.

The first biasing element 406a includes a first end 512 adjacent the outlet 114 of the aft cowl 110 and a second end 514 that extends in the fore direction towards a circumferential stiffener 516. For example, the first end 512 is flush with the outlet 214. However, the first end 512 can be offset relative to the outlet 214 (e.g., by a distance of approximately between one inch and three inches, etc.). The circumferential stiffener 516 is a hat stiffener that is coupled to the inner surface 327 of the aft cowl 110 and which extends around a substantial portion (e.g., approximately between 70 percent and 90 percent) of the circumference of the aft cowl 110 (e.g., the flexible portion 352 of the aft cowl 110). The circumferential stiffener 516 provides structural support to the aft cowl 110. The first panel 502 supports the connector 357. However, the other skin segments 402 (e.g., the skin segments 402b-402e) do not have the connector 357. In some examples, the connector 357 may not be needed. In some examples, the circumferential stiffener 516 can be used to connect (e.g., join) the terminating ends 316c of the first inner wall 316a and the second inner wall 316b (see FIG. 3B). The circumferential stiffener 516 includes a side-to-side latch system that can couple the terminating ends 316c. For example, the circumferential stiffener 516 can be located in proximity to the edge 214 of the aft cowl 110, which can couple the terminating ends 316c without the need of the connector 357.

Figure 6:
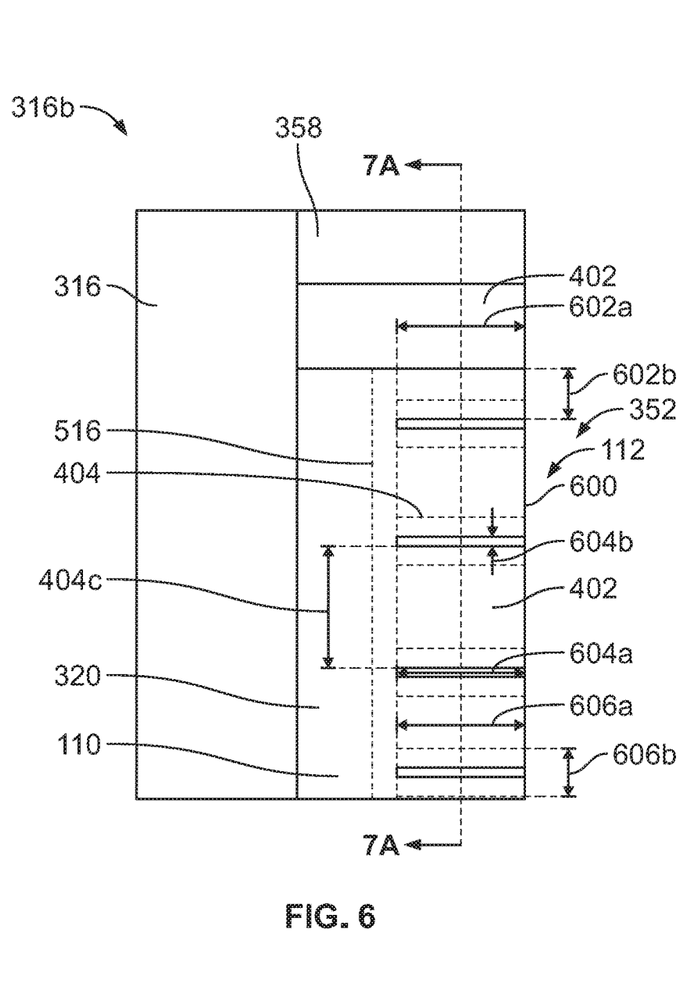
FIG. 6 is a side view of the example second inner wall of FIGS. 4A and 5.

FIG. 6 is a side view of the second inner wall portion 316b of FIGS. 4A and 5. specifically, in the illustrated example of FIG. 6, the second inner wall portion 316b of the aft cowl 110 is flattened for ease of description with respect to the dimensions of the aft cowl 110. Specifically, the outer surface 320 of the second inner wall portion 316b is shown in FIG. 6. The circumferential stiffener 516 and the biasing elements 406 are shown in dashed lines as those elements are located on the inner surface 327 of the second inner wall portion 316b opposite the outer surface 320. The circumferential stiffener 516 extends along a circumference of the flexible portion 352. However, the circumferential stiffener 516 does not extend along (e.g., terminates at) the non-flexible portion 358 of the aft cowl 110.

The skin segments 402 are formed on the aft cowl 110. Each of the skin segments 402 extends from an aft edge 600 of the outlet 214 in a fore direction toward the circumferential stiffener 516 a first distance 602a. For example, the first distance 602a can be between approximately six (6) inches and thirty-six (36) inches. Additionally, each of the skin segments 402 has a first width 602b. For example, the first width 602b can be between approximately zero (0) inches and Thirty-six (36) inches.

Each of the slots 404 extends a second distance 604a from the outlet 214 in a fore direction toward the circumferential stiffener 516. For example, the second distance 604a can be between approximately six (6) inches and thirty-six (36) inches. Additionally, each of the slots 404 has a second width 604b. For example, the second width 604b can be between approximately zero (0) inches and One (1) inch. The first distance 602a and the second distance 604a of FIG. 6 are the same (e.g., identical). However, in some examples, the first distance 602a may be different than (e.g., greater than or less than) the second distance 604a. Additionally, the slots 404 are spaced from each other by a radial distance 604c (e.g., a circumferential or vertical distance). In some examples, the radial distance 604c is uniform (e.g., identical) between respective slots 404. However, in some examples, the radial distance 604c may be nonuniform (e.g., unequal) between the respective slots 404. However, the slots 404 and skin segments 402 can have any configuration based on the desired characteristics of the aircraft 100.

Each of the biasing elements 406 extends a third distance 606a (e.g., a length) from the aft edge 600 of the outlet 214 toward the circumferential stiffener 516 in a fore direction. For example, the third distance 606a can be between approximately six (6) inches and Thirty-six (36) inches Additionally, each of the biasing elements 606 has a third width 606b. For example, the third width 606b can be between approximately two (2) inches and eight (8) inches. In some examples, the third width 606b of the biasing elements 406 can span the slots 404 (e.g., gaps) to seal air from flowing between (e.g., into and out of) the core compartment 326 and the fan bypass 212. In some examples, the biasing elements 406 can include seals to seal the slots 404 of the aft cowl 110. The third distance 606a of FIG. 6 is substantially the same (e.g., identical to) the first distance 602a and the second distance 604a are the same (e.g., identical). However, in some examples, the third distance 606a can be different than (e.g., greater than or less than) the first distance 602a and/or the second distance 604a. The third width 606b of FIG. 6 is different than the first width 602b and the second width 604b.

Figure 7A:
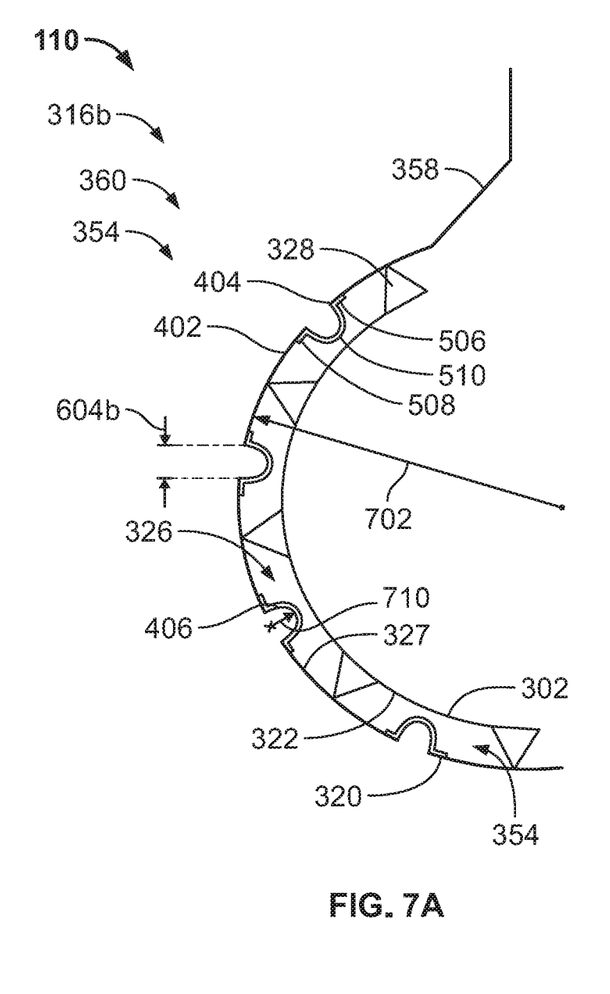
FIG. 7A is a cross-sectional view of the example second inner wall of FIGS. 4A, 5 and 6 shown in an example first position.
Figure 7B:
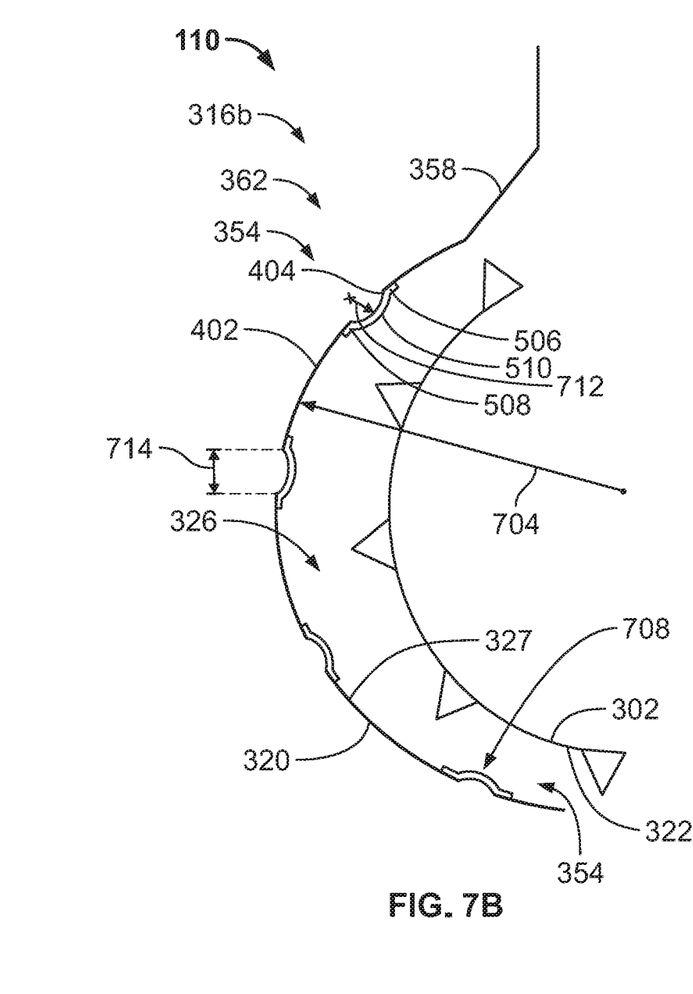
FIG. 7B is a cross-sectional view of the example second inner wall of FIGS. 4A, 5 and 6 shown in an example second position.

FIG. 7A is a cross-sectional view of the second inner wall portion 316b taken along line 7A-7A of FIG. 6 shown in the first radial position 360. FIG. 7B is a cross-sectional view of the second inner wall portion 316b of FIG. 6 shown in the second radial position 362. As noted above, the flexible portion 352 moves radially between the first radial position 360 in response to pressure within the core compartment 326 (e.g., between the inner surface 327 and the outer surface 322 of the engine core 302) not exceeding a pressure threshold and the second radial position 362 in response to pressure within the core compartment 326 exceeding the pressure threshold. In the illustrated example, the flexible portion 352 has a first radius 702 in the first radial position 360 and a second radius 704 greater than the first radius 702 in the second radial position 362. As such, the throat area 354 defined by the flexible portion 352 is greater when the flexible portion 352 is in the second radial position 362 than when the flexible portion 352 is in the first radial position 360.

In the illustrated example, the skin segments 402 move in a radial direction away from the engine core 302 when the flexible portion 352 is in the second radial position 362, and the skin segments 402 move in a radial direction towards the engine core 302 when the flexible portion 352 is in the first radial position 360. To enable the skin segments to move radially, the biasing elements 406 expand and contract based on the pressure within the nacelle 200 (e.g., the throat area 354 and/or the fan bypass 212). For example, the body 510 is in a first position 706 (e.g., a non-deflected position, an initial position) in the first radial position 360 and the body 510 is in a second position 708 (e.g., a deflected or stretched position) in the second radial position 362. That is, the biasing elements 406 allow the skin segments 402 to move radially. For example, the body 510 of each of the biasing elements 404 has a first radius of curvature 710 when the flexible portion 352 is in the first radial position 360 and a second radius of curvature 712 greater than the first radius of curvature 710 when the flexible portion 352 is in the second radial position 362. Thus, the body 510 of the biasing elements 406 deflects to enable the skin segments 402 to move radially. The first flange 506 and the second flange 508 of the biasing elements 406 remain coupled (e.g., fixed) to respective ones of the skin segments 402 when the flexible portion 352 moves between the first radial position 360 and the second radial position 362. To this end, a gap defined by the slots 404 varies (e.g., increases or decreases) as the flexible portion 352 moves between the first radial position 360 and the second radial position 362. For example, the slots 404 have the second width 604b when the flexible portion 352 is in the first radial position 360 and a second width 714 greater than the second width 604b when the flexible portion 352 is in the second radial position 362. For example, the gap is defined between lateral edges of the adjacent skin segments 402.

During operation, the biasing element 406 maintains the skin segment 402 in the first radial position 360 such that the slots 404 have the second width 604b. Additionally, the standoffs 328 limit radial movement of the flexible portion 352 to the first radial position 360. For example, the standoffs 328 engage the skin segments 402 when the flexible portion is in the first radial position 360. When pressure within the core compartment 326 needs to be released, the biasing elements 406 expand to increase the slots 404 to the second width 714 to relieve the pressure.

The skin segments 402 and/or the biasing elements 406 can be composed of aluminum, steel, titanium and/or any other material(s). In some examples, the skin segments 402 are composed of a first material and the biasing elements 406 are composed of a second material different than the first material. In some examples, the skin segments 402 and the biasing elements 406 are composed of the same material(s).

Figure 8:
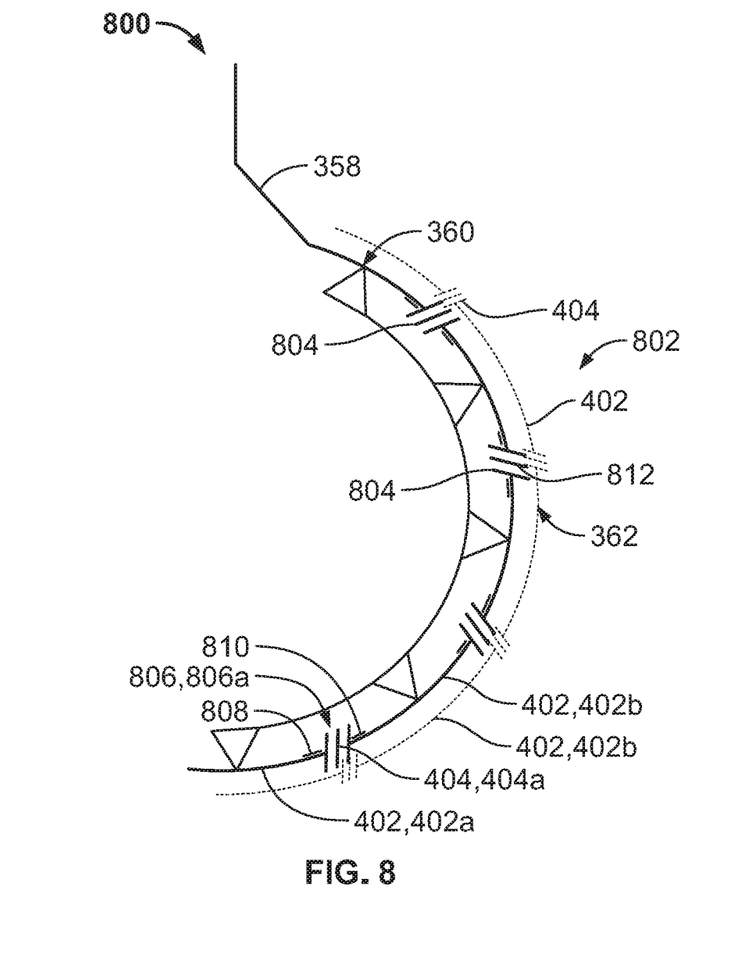
FIGS. 8 and 9 depict other example aft cowls disclosed herein that can implement the example aircraft engine of FIG. 1.
Figure 9:
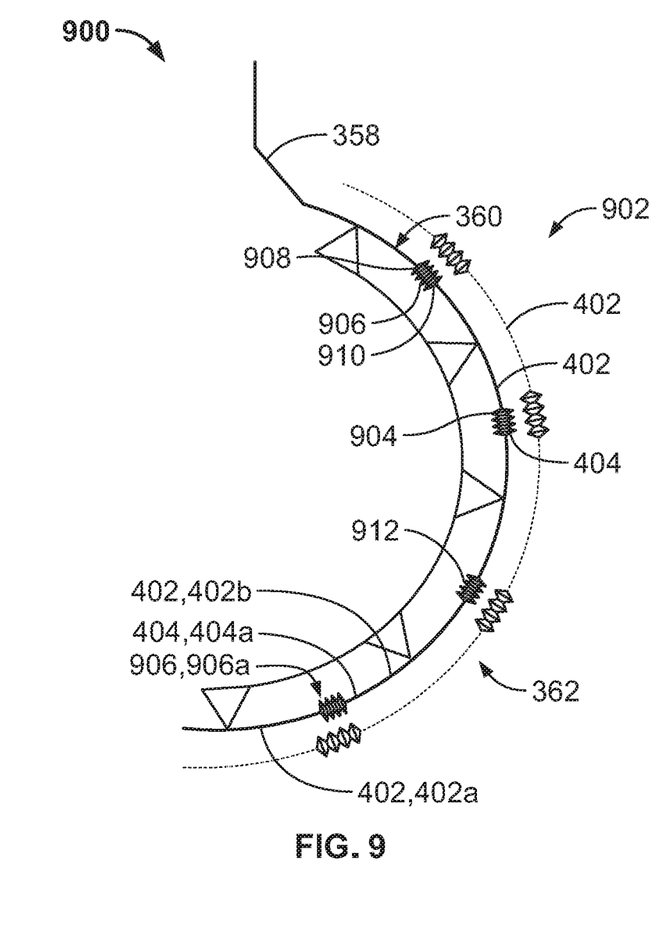

FIGS. 8 and 9 illustrate other example aft cowls 800 and 900 disclosed herein that can implement the aircraft engine 106 of FIG. 1. Those components of the aft cowls 800 and 900 of FIGS. 8 and 9 that are substantially similar or identical to the components of the aft cowl 110 described above and that have functions substantially similar or identical to the functions of those components will not be described in detail again below. Instead, the interested reader is referred to the above corresponding descriptions. To facilitate this process, similar reference numbers will be used for like structures.

FIG. 8 is a cross-sectional view of an aft cowl 800 similar to the cross-sectional view of FIG. 7A. The aft cowl 800 includes a flexible portion 802 and a non-flexible portion 358. The flexible portion 802 can move (e.g., expand and/or contract) radially between a first radial position 360 shown in solid line and a second radial position 362 shown in dashed line. The flexible portion 802 can radially expand similar to the flexible portion 352 described above. For example, the flexible portion 802 has skin segments 402 separated by slots 404 along a circumference of the aft cowl 800. The aft cowl 800 includes biasing elements 804 to enable flexible portion 802 to expand radially. For example, the biasing elements 804 enable the skin segments 402 to move (e.g., expand and/or contract) radially and implement the flexible portion 802. The biasing elements 804 of the aft cowl 800 include a plurality of springs 806 (e.g., instead of the hat stiffeners described above). The springs 806 of FIG. 8 are tangential springs. However, in some examples, the springs 806 can be compression springs and/or any other type of spring(s) or biasing element(s). The springs 806 overlap (e.g., extend across or span) the slots 404 and are attached or coupled to respective adjacent skin segments 402 defined by the respective ones of the slots 404. For example, a first spring 806a include a first end 808 to attach to a first skin segment 402a and a second end 810 to attach to a second skin segment 402b. The springs 806 include a body 812 that overlaps (e.g., spans across) a first slot 404a between the first skin segment 402a and the second skin segment 402b. The springs 806 can be composed of steel, titanium and/or any other suitable material(s).

FIG. 9 is a cross-sectional view of an aft cowl 900 similar to the cross-sectional view of FIG. 7A. The aft cowl 900 includes a flexible portion 902 and a non-flexible portion 358. The flexible portion 902 can move (expand and/or contract) radially between a first radial position 360 shown in solid line and a second radial position 362 shown in dashed line. The flexible portion 902 can move (expand and/or contract) radially similar to the flexible portion 352 described above. For example, the flexible portion 902 has skin segments 402 separated by slots 404 along a circumference of the aft cowl 900. The aft cowl 900 includes biasing elements 904 to enable flexible portion 902 to move radially. For example, the biasing elements 904 enable the skin segments 402 to move radially (expand and/or contract) to implement the flexible portion 902. The biasing elements 904 of the aft cowl 900 include a plurality of bellows 906 (e.g., instead of the hat stiffeners described above) that overlap respective ones of the slots 404. The bellows 906 expand and contract to allow the flexible portion 902 to move between the first radial position 360 and the second radial position 362. For example, a first bellow 906a includes a first end 908 to attach to a first skin segment 402a and a second end 910 to attach to a second skin segment 402b. The first bellow 906a includes a body 912 that overlaps a first slot 404a between the first skin segment 402a and the second skin segment 402b. The bellows 906 can be composed of steel, titanium and/or any other suitable material(s).

In some examples, the aft cowl 110, 800, 900 defines means for defining a core engine compartment (e.g., the core compartment 326) adjacent the engine core 302. In some examples, the aft cowl 110, 800, 900 provides means for ventilating the core compartment 326 of the engine core 302. In some examples, the aft cowl 110, 800, 900, the inner wall 316 (e.g., the first inner wall portion 316a and the second inner wall portion 316b), and/or the flexible portion 352, 802, 902 provide means for defining the throat area 354 and/or the outlet 214 of the aircraft engine 106 and/or the aft cowl 110, 800, 900. In some examples, the flexible portion 352, 802, 902 provides means for radially moving the throat area 354 and/or the aft cowl 110, 800, 900 between the first radial position 360 and the second radial position 362. In some examples, the skin segments 402, the slots 404 and the biasing elements 406, 804, 904 provide means for radially moving the throat area 354 and/or the aft cowl 110, 800, 900 between the first radial position 360 and the second radial position 362. In some examples, the biasing elements 406, 804, 904 provide means for radially moving the throat area 354 and/or the aft cowl 110, 800, 900 between the first radial position 360 and the second radial position 362. In some examples, the flexible portion 352, 802, 902 provide means for releasing pressure within the core compartment 326 when the pressure in the core compartment exceeds a pressure threshold (e.g., a burst pressure threshold).

Although each of the aft cowls 110, 800 and 900 disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. The features of one example are not mutually exclusive to the features of another example. Instead, the scope of this disclosure encompasses any combination of any of the features. In some examples, an aft cowl disclosed in accordance with the teachings of this disclosure may have a combination of the features of the biasing elements 406, 804, 904, and/or any other component(s), structure(s) or feature(s) disclosed herein. For example, an aft structure can include a combination of two or more biasing elements 406, 804, and 904.

From the foregoing, it will be appreciated that the aft cowl disclosed herein mitigates the complexity, cost, and weight associated with conventional pressure relief doors, thereby improving the efficiency and operation of aircrafts.

At least some of the aforementioned examples include one or more features and/or benefits including, but not limited to, the following:

In some examples, an aft cowl includes a flexible portion defining a throat area adjacent an engine core nozzle of the aircraft engine, where the flexible portion is to move radially between a first radial position in response to pressure within a nacelle not exceeding a pressure threshold and a second radial position in response to pressure within the nacelle exceeding the pressure threshold. The throat area is defined by the flexible portion is greater when the flexible portion is in the second radial position than when the flexible portion is in the first radial position.

In some examples, the flexible portion moves in a radial direction away from an engine core of the aircraft engine when the flexible portion moves toward the second radial position.

In some examples, the flexible portion moves in a radial direction towards an engine core of the aircraft engine when the flexible portion moves towards the first radial position.

In some examples, the flexible portion includes a plurality of skin segments formed by a plurality of slots.

In some examples, the plurality of slots extends in an aft-fore direction a first distance from an aft edge of the aft cowl.

In some examples, a plurality of biasing elements to couple the plurality of skin segments.

In some examples, each of the biasing elements includes a first end, a second end and a body formed between the first end and the second end.

In some examples, a first end of a first biasing element is coupled to a first skin segment and a second end of the first biasing element is coupled to a second skin segment such that a body of the first biasing element overlaps a first slot formed between the first skin segment and the second skin segment.

In some examples, the flexible portion is supported by a radial bracket of the aircraft engine when the flexible portion is in the first radial position.

In some examples, the flexible portion is composed of at least one of aluminum or titanium.

In some examples, the pressure threshold is based on a burst duct pressure threshold of the nacelle.

In some examples, an aft cowl includes a skin including a first skin segment and a second skin segment radially spaced from the first skin segment to form a gap therebetween, and a biasing element to couple the first skin segment and the second skin segment.

In some examples, the biasing element enables radial movement of the skin towards a first radial position when a pressure within a nacelle does not exceed a pressure threshold and enables radial movement of the skin towards a second radial position when the pressure within the nacelle exceeds the pressure threshold.

In some examples, the biasing element includes a first portion coupled to the first skin segment a second portion coupled to the second skin segment, and a body portion positioned between the first and second portions.

In some examples, the body portion includes a first radius of curvature when the skin is in the first radial position and a second radius of curvature greater than the first radius of curvature when the skin is in the second radial position.

In some examples, the body portion of the biasing element extends across the gap when the biasing element is coupled to the first and second skin segments.

In some examples, the biasing element is an axial hat stiffener.

In some examples, the biasing element is a tangential spring or a bellows.

In some examples, an aft cowl includes means for defining an engine compartment adjacent an engine core of an aircraft engine, at least a portion of the means for defining the engine compartment defining a throat area adjacent an engine core nozzle of the aircraft engine. The aft cowl includes means for radially moving the means for defining the engine compartment between a first radial position in response to pressure within the means for engine compartment not exceeding a pressure threshold and a second radial position in response to pressure within the means for defining the engine compartment exceeding the pressure threshold. The means for radially moving to vary the throat area when the means for defining the engine compartment moves between the first radial position and the second radial position.

In some examples, the means for radially moving the means for defining the engine compartment includes means for forming a first skin segment and a second skin segment spaced from the first skin segment.

In some examples, the means for radially moving the means for defining the engine compartment includes means for biasing having a first end attached to the first skin segment and a second end attached to the second skin segment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aft cowl for an aircraft engine, the aft cowl comprising:
   a flexible portion defining a throat area adjacent a discharge nozzle of an engine core of the aircraft engine, the flexible portion to move radially between a first radial position in response to pressure within a core compartment of the aircraft engine not exceeding a pressure threshold and a second radial position in response to pressure within the core compartment exceeding the pressure threshold, the throat area defined by the flexible portion being greater when the flexible portion is in the second radial position than when the flexible portion is in the first radial position, the flexible portion including:
   a first skin segment;
   a second skin segment;
   a slot located between the first skin segment and the second skin segment; and
   an axial hat stiffener having a first flange coupled to an inner surface of the first skin segment, a second flange spaced apart from the first flange and coupled to an inner surface of the second skin segment, and a body spanning across the slot and coupling the first flange and the second flange, the body extending in a radially inward direction away from the slot and toward the engine core.

2. The aft cowl of claim 1, wherein the flexible portion moves in a radial direction away from the engine core as the flexible portion moves from the first radial position toward the second radial position.

3. The aft cowl of claim 1, wherein the flexible portion moves in a radial direction toward the engine core as the flexible portion moves from the second radial position toward the first radial position.

4. The aft cowl of claim 1, wherein the slot extends in an aft-fore direction a first distance from an aft edge of the aft cowl.

5. The aft cowl of claim 1, wherein the flexible portion is supported by a radial standoff when the flexible portion is in the first radial position, wherein the radial standoff is supported by and extends radially outward from the engine core.

6. The aft cowl of claim 1, wherein the flexible portion is composed of at least one of aluminum or titanium.

7. The aft cowl of claim 1, wherein the pressure threshold is a burst duct pressure threshold of the core compartment.

8. The aft cowl of claim 1, wherein the body has a first radius of curvature when the flexible portion is in the first radial position and a second radius of curvature greater than the first radius of curvature when the flexible portion is in the second radial position.

9. The aft cowl of claim 1, further comprising a non-flexible portion having a first end and a second end located opposite the first end, the first end coupled to the flexible portion, the second end coupled to a pylon that supports the aircraft engine.

10. An aft cowl for an aircraft engine, the aft cowl comprising:
    a flexible skin located radially outward from a discharge nozzle of an engine core of the aircraft engine, the flexible skin including:
    a first skin segment;
    a second skin segment; and
    a slot located between the first skin segment and the second skin segment; and
    an axial hat stiffener having a first flange coupled to an inner surface of the first skin segment, a second flange coupled to an inner surface of the second skin segment, and a body spanning across the slot and coupling the first flange and the second flange, the body extending in a radially inward direction away from the slot and toward the engine core;
    wherein the axial hat stiffener enables radial movement of the flexible skin away from a first radial position and toward a second radial position when a pressure within a core compartment of the aircraft engine exceeds a pressure threshold and enables radial movement of the flexible skin away from the second radial position and toward the first radial position when the pressure within the core compartment does not exceed the pressure threshold.

11. The aft cowl of claim 10, wherein the body has a first radius of curvature when the flexible skin is in the first radial position and a second radius of curvature greater than the first radius of curvature when the flexible skin is in the second radial position.

12. The aft cowl of claim 10, further comprising a non-flexible skin having a first end and a second end located opposite the first end, the first end coupled to the flexible skin, the second end coupled to a pylon that supports the aircraft engine.

13. The aft cowl of claim 10, wherein the flexible skin moves in a radial direction away from the engine core as the flexible skin moves from the first radial position toward the second radial position, and the flexible skin moves in a radial direction toward the engine core as the flexible skin moves from the second radial position toward the first radial position.

14. The aft cowl of claim 10, wherein the flexible skin defines a throat area adjacent a discharge nozzle of the engine core, the throat area being greater when the flexible portion is in the second radial position than when the flexible portion is in the first radial position.

15. The aft cowl of claim 10, wherein the flexible skin is supported by a radial standoff when the flexible skin is in the first radial position, wherein the radial standoff is supported by and extends radially outward from the engine core.

16. An aircraft engine, comprising:
    an engine core having an outer surface;

an inner wall located radially outward from the outer surface of the engine core, the inner wall having an inner surface;

a core compartment defined by the outer surface of the engine core and the inner surface of the inner wall;

a fluid device configured to extract bleed air from an engine compressor of the aircraft engine;

a conduit in fluid communication with the fluid device, the conduit configured to route extracted bleed air from the fluid device to an aircraft system to be powered by the aircraft engine, the conduit including a portion located within the core compartment, wherein the extracted bleed air is to enter the core compartment in response to a burst event associated with the portion of the conduit; and an aft cowl located adjacent the inner wall, the aft cowl including a flexible portion defining a throat area adjacent a discharge nozzle of the engine core, the flexible portion to move radially between a first radial position in response to pressure within the core compartment not exceeding a burst pressure threshold and a second radial position in response to pressure within the core compartment exceeding the burst pressure threshold, the throat area being greater when the flexible portion is in the second radial position than when the flexible portion is in the first radial position, the burst pressure threshold corresponding to an increase in pressure that occurs within the core compartment in response to the burst event;

wherein the flexible portion includes:

a first skin segment;

a second skin segment;

a slot located between the first skin segment and the second skin segment; and an axial hat stiffener having a first flange coupled to an inner surface of the first skin segment, a second flange spaced apart from the first flange and coupled to an inner surface of the second skin segment, and a body coupling the first flange and the second flange, the body spanning across the slot, the body extending in a radially inward direction away from the slot and toward the engine core.

17. The aircraft engine of claim 16, wherein the flexible portion is supported by a radial standoff when the flexible portion is in the first radial position, wherein the radial standoff is supported by and extends radially outward from the engine core.

18. The aircraft engine of claim 16, wherein the aft cowl further includes a non-flexible portion having a first end and a second end located opposite the first end, the first end coupled to the flexible portion, the second end coupled to a pylon that supports the aircraft engine.

19. The aircraft engine of claim 16, wherein the flexible portion moves in a radial direction away from the engine core as the flexible portion moves from the first radial position toward the second radial position, and the flexible portion moves in a radial direction toward the engine core as the flexible portion moves from the second radial position toward the first radial position.

* * * * *